United States Patent [19]
Möller et al.

[11] Patent Number: 4,942,571
[45] Date of Patent: Jul. 17, 1990

[54] ON-BOARD NETWORK FOR MOTOR VEHICLES

[75] Inventors: Antonius Möller, Delmenhorst; Herbert Reimann, Oldenburg; Bernhard Schürmann, Brake; Gerold Wilts, Ovelgoenne, all of Fed. Rep. of Germany

[73] Assignee: Bergmann Kabelwerke AG, Berlin & Brake, Fed. Rep. of Germany

[21] Appl. No.: 241,612

[22] Filed: Sep. 8, 1988

[30] Foreign Application Priority Data

Sep. 8, 1987 [DE] Fed. Rep. of Germany ....... 3730468

[51] Int. Cl.$^5$ .............................................. H04J 3/02
[52] U.S. Cl. ................................. 370/85.1; 370/85.13; 370/94.3; 307/10.1
[58] Field of Search ................. 370/85, 94; 340/825.5, 340/825.51, 825.57, 825.04, 825.05; 307/10.1, 39

[56] References Cited

U.S. PATENT DOCUMENTS

| 3,965,366 | 6/1976 | Sumida et al. | 307/10.1 |
| 4,298,860 | 11/1981 | Norberg et al. | 340/825.04 |
| 4,459,591 | 7/1984 | Haubner et al. | 340/825.57 |
| 4,491,838 | 1/1985 | West | 340/825.05 |
| 4,538,262 | 8/1985 | Sinniger et al. | 307/10.1 |
| 4,584,487 | 4/1986 | Hesse et al. | 370/85 |
| 4,607,256 | 8/1986 | Henzel | 340/825.05 |
| 4,715,031 | 12/1987 | Crawford et al. | 370/85 |
| 4,716,408 | 12/1987 | O'Connor et al. | 370/85 |
| 4,719,622 | 1/1988 | Whipple et al. | 370/85 |
| 4,780,620 | 10/1988 | Högberg et al. | 370/85 |
| 4,809,266 | 2/1989 | Okada | 370/85 |
| 4,823,122 | 4/1989 | Mann et al. | 340/825.5 |

FOREIGN PATENT DOCUMENTS

| 0011313 | 6/1978 | European Pat. Off. . |
| 0143649 | 11/1984 | European Pat. Off. . |
| 0190697 | 2/1986 | European Pat. Off. . |
| 0194915 | 2/1986 | European Pat. Off. . |
| 2451512 | 10/1974 | Fed. Rep. of Germany . |
| 3429941 | 8/1984 | Fed. Rep. of Germany . |
| 2353412 | 6/1977 | France . |
| 0138390 | 10/1981 | Japan | 340/825.57 |
| 0195659 | 10/1985 | Japan | 370/85 |
| 0084936 | 4/1986 | Japan | 370/85 |

OTHER PUBLICATIONS

E. D. van Veldhuizen, Ing., Proposal for an Automotive Multiplex Wiring System, 1985, 227–230.
Paul Langer, Geatrans 2100, Ein Flexibles und Leistungsfahiges Fernwirksystem mit Integrierten Prozebrechnern, 1976, 102–124.
Von Norbert Budnik, Ein Impuls-Fernwirksystem fur Anwendungen in Nachrichtenanlagen, 1971, 385–389.
D. Homburg, Internationale Elektronische Rundschau, vol. 29, No. 12 (Dec. 1975).

Primary Examiner—Douglas W. Olms
Assistant Examiner—Alpus Hsu
Attorney, Agent, or Firm—Kenyon & Kenyon

[57] ABSTRACT

The on-board network for motor vehicles contains a multiplex control for switching, controlling and monitoring electrical end devices such as switches, operating and indicating elements, sensors and actuators and consists of several bus interfaces (2) coupled to a common bus line (1). The network also includes control devices (4) associated in star configuration via signal lines with the bus interfaces and end devices associated with the control devices. The control devices (4) contain signal converters and a data processor as well as transmitters/receivers for exchanging data signals with the corresponding bus interface. The operation of the on-board network is accomplished in such a manner that the transmission of the data signals from one bus interface to the associated control devices is controlled by the bus interface and follows cyclically the respective control device in the sequence of the groups of inputs and outputs. The control devices can deliver here, for transmitting a critical signal value to the corresponding bus interface device at predetermined points of the transmission cycle, a signal which leads to the interruption of the transmission cycle.

15 Claims, 3 Drawing Sheets

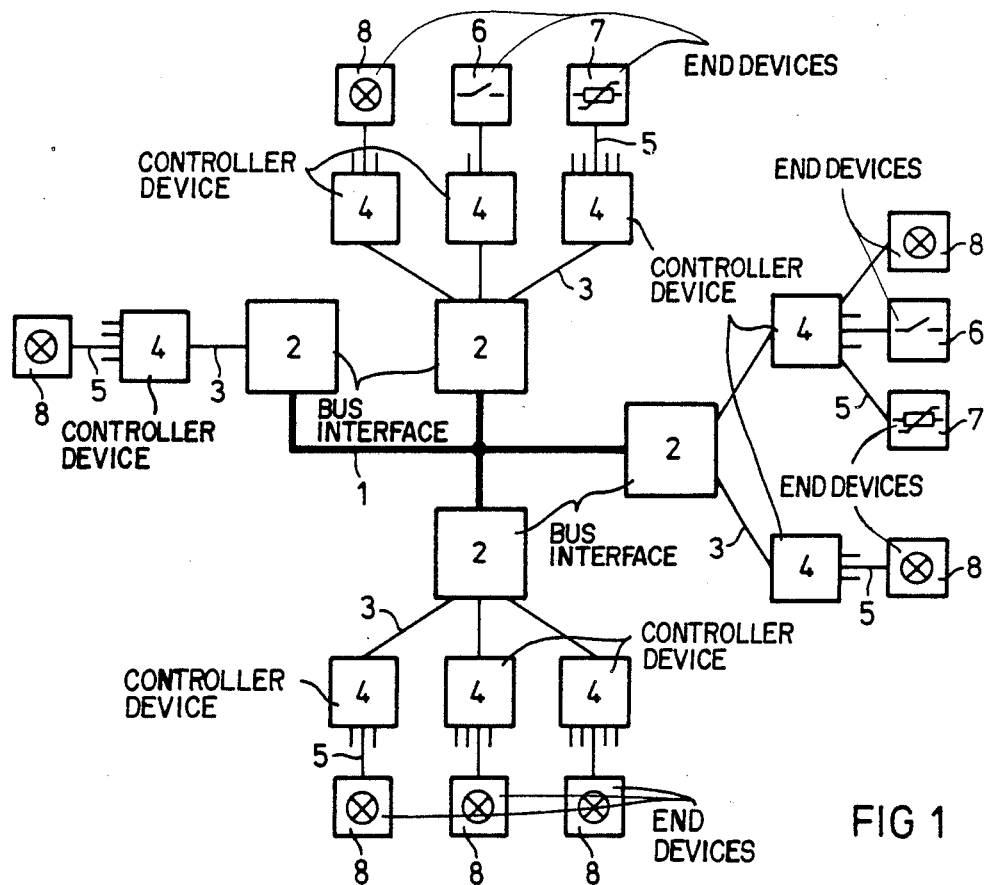
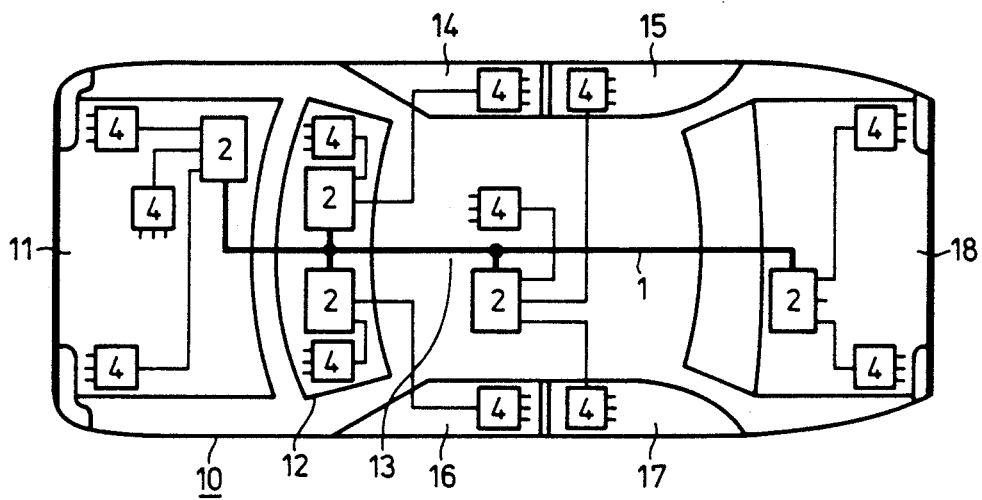
FIG 1
FIG 2

ON-BOARD NETWORK FOR MOTOR VEHICLES

BACKGROUND OF THE INVENTION a. Field of Invention

The invention pertains to the field of on-board networks for motor vehicles and more particularly to an on-board network equipped with a multiplex control for switching, controlling and monitoring electrical end devices such as lights, windows, and so on.

b. Description of the Prior Art

Through technical development, the functional performance of motor vehicles, the ease of operation and the comfort of the occupants have been improved substantially in recent years. These improvements resulted in an extensive enlargement of the electrical equipment for motor vehicles. For connecting individual devices, wiring harnesses are used which sometimes contain line lengths of more than 500 meters of wires and over 1,000 electrical plug connections. These harnesses are of very complex design and are prone to manufacturing errors since the fabrication of a harness is done predominantly manually. Furthermore, the harnesses are sometimes difficult to install and have poor accessibility for repair purposes. It has therefore been proposed already to replace the wire-harness of a motor vehicle by an on-board network, in which particularly the different electrical end devices such as operating elements, sensors and similar devices (e.g., indicators, lamps, heaters, motors, actuators) being arranged in the periphery of the body and are interconnected through a multiplex-system which is superimposed on a power supply system. These known on-board networks consist of respective signal lines and electronic electrical subassemblies which are disposed at numerous points in the car. The subassemblies receive or deliver control and monitoring signals and also switch on or off electrical devices directly. The subassemblies are connected to each other via signal lines and signal converters, transmitters, receivers and control devices. The arrangement and connection of the subassemblies to each other is based either on a bus line, a ring or a star configuration. In on-board networks which consist of a bus line, several bus interfaces are connected to the bus line and peripheral end devices are associated with the bus interfaces, the bus interfaces are equipped for communication with each other with transmitters and receivers for the exchange of data signals. These on-board networks contain as a rule a multiplexer control and operate frequently by means of an asynchronous signal transmission and with random bus access for switching, controlling and monitoring the electrical end devices. Every bus interface contains an arbitration device for resolving conflicts in the case of simultaneous access requests of several bus interfaces to the bus line.

The state of the art is represented, for instance, by the following patents and articles: DE-A-24 33 025 DE-A-34 17 956 DE-A-35 45 293 DE-A-29 09 213 DE-A-34 29 941 EP-A-0 008 238 DE-A-31 49 142 DE-A-35 22 907 EP-A-0 014 556 DE-A-33 35 932 DE-A-35 35 860 EP-A-0 023 105 "Proposal for an Automotive Multiplex Firing System," No. C 205/85 in IMechE 1985, pages 227 to 230; "Systems Consideration for Incorporating Vehicle Data Networks (Multiplex) into Automobiles;" No. C 218/85 in IMechE 1985, pages 209 to 216; SAE Technical Paper Series No. 860389 "Chrysler Collision Detection ($C^2D$), a Revolutionary Vehicle Network."

In these known on-board networks, a complete system failure due to defects in a transmission line (in the case of a bus or a ring configuration) or due to the failure of the central station (in the case of a star configuration) can easily occur.

OBJECTIVES AND SUMMARY OF THE INVENTION

It is an object of the invention to improve the design of the on-board network in such a manner that it can be adapted flexibly to different requirements.

A further object is to provide a network with improved reliability wherein failure in subsystems as can occur, for instance, in the case of accidents, have only slight effects on the overall system.

According to the invention, a network is provided with controller devices which are arranged between the bus stations and the peripheral end devices, wherein several end devices are always associated with a controller device in a star configuration and wherein always one or more controller devices are always associated in a star configuration with a bus interface through a corresponding signal line. Each controller device is equipped with signal translators for receiving binary or analog signals from the end devices and for delivering binary and/or analog signals to the end devices, and each controller device is provided with a transmitter and receiver for the interchange of data with the corresponding bus interface. Each bus interface is provided with transmitters and receivers for the interchange of data with the corresponding controller devices via separate signal lines.

The basic structure of an on-board network designed in this manner is characterized by a hybrid topology, since a bus configuration and a star configuration are combined. This hybrid configuration leads to a high modularity of the on-board network, i.e., it can be adapted very simply to different requirements and can also be expanded at will in different steps without limitation. In this network, only the technical equipment required for the specific expansion need to be provided Through the use of the star configuration in the area of the controller devices and the end devices, subsystems are present in this area which are largely independent of each other and can be associated particularly with individual subsystems in the motor vehicle. For instance, a motor vehicle could be partitioned into a right, left or middle area. Alternately separate areas may be designated for the doors, the seats, the air conditioning system, the dash board or the central console each having operating and indicating elements associated with the front or the peripheral body areas. These areas with one or more associated controller devices and the corresponding end devices can furthermore be coupled to each other easily using the bus interface assigned to them and the bus line, leading to a vehicle completely equipped with a multiplex system. Additional bus interfaces can be coupled simply to the existing bus line and thereby obtain direct access to all date available in the body area.

By the hybrid configuration of the on-board network, the reliability of the system is increased substantially since failures of individual end devices do not influence the flow of information adversely in the remaining part of the on-board network. Furthermore, failures of controller devices or of a bus interface remain confined to the locally concerned area. This on-board network is realized with relatively few components since simple electronic modules, particularly simple microcontrollers can be used for the controller devices. Only the bus interfaces are equipped with more sophisticated microprocessor and memory modules.

The relatively few bus interfaces connected to the bus line organize and transact the data traffic on the bus line independently. Advantageously, use is made here of the known wired-or logic-type coupling of bus interfaces. Since the logical processing and interlinking of the signals takes place in the bus interfaces, a large processing capability is required for these parts of the on-board network and thereby, relatively high-quality electronic equipment is required. It is therefore advisable to arrange these parts of the on-board network, together with the bus line, in that part of the motor vehicle which generally remains largely undamaged in the case of accidents. Especially in motor vehicles with a dimensionally stiff zone and with more easily deformable zones and with peripheral end devices arranged in the region of the body and the bottom of the vehicle, the bus line and the bus interfaces are therefore arranged advantageously in the region of the longitudinal axis of the motor vehicle within the dimensionally stiff zone, while the control devices are located in the more deformable region of the body or the bottom of the vehicle.

The new modular on-board network with the hybrid bus configuration gives the opportunity to arrange the subassemblies required for switching, controlling and monitoring the end devices in such manner that high data processing capability is required only in the bus interfaces. Each bus interface forms a local central for the associated control devices. It has been found practical to assign a maximum of three control devices to one bus interface. Preferably each control device comprises a data processor for pre- and post-processing of the signals to be received by the corresponding bus interface or to be passed on to the bus interface. Thereby, the bus interface is relieved of many tasks related to signal procesing, signal conversion (analog/digital and vice versa) or for error detection. In addition, the processing capacity of the control devices is utilized optimally.

The function of a bus interface as a local central for the subsequent control devices can be emphasized further by the provision that the inputs or outputs of the control devices associated with the end devices are always combined to form one or several groups of the same type and that each bus interface contains a modem device for the cyclic transmission of the data from and to the corresponding control devices in a time-division multiplexing scheme in which a sequence of signals are transmitted. Each sequence includes groups of signals with each group corresponding to a group of input/output signals of a respective control device. Since only simple data processors for pre- and post-processing of the signals are required in the control devices, the data transmission between the control devices and the corresponding bus interface can take place serially at a low transmission rate. The control devices are advantageously designed so that 24 digital inputs/outputs or 16 digital and 8 analog inputs/outputs can be served by them. To these inputs/outputs, end devices are connected either via conventional lines or one control device and several end devices belonging together are jointly arranged in a housing.

If only few end devices are arranged in the vicinity of a bus interface or one or several end devices are located in the immediate vicinity of the bus interface, that bus interface comprises additionally a signal converter for the direct pickup and/or direct output of binary and/or analog signals values as well as a data processing processor. In this case, the end devices can be connected directly to the bus interface.

The modular design of the new on-board network can be further improved by the provision that each bus interface contains an address converter for the logical conversion of the local addresses, that are addresses specific to the subassembly of the end devices, into global, function-oriented addresses and vice versa. For example, a global address may be assigned to all the door locks, or all the windows, whereby they could be activated with a single command on the parallel bus. It is ensured thereby that in the event of a hardware expansion of the on-board network, the additional subassembly requires no or only few items of information regarding the actual structure of the on-board network and the electrical functions of the end devices represented by the new subassemblies can be readily incorporated and processed in the on-board network without problems. The address converters assure here a uniform "language" on the bus line which can be understood and processed without problem. By means of the address converters a function-oriented classification of the end devices such as "door," "lights" or "seat" is accomplished in contrast to the otherwise module-specific characterization of signals, which would have to consist, for instance, of the position within a group, the group number, the number of the interface device and a number of the bus interface. The unique assignment given thereby, of the signals of the end devices, likewise provides room for later extensions of the on-board network. By this manner of converting the local addresses of the end devices into global function-oriented addresses and vice versa, it is also possible to change the assignment of end devices to certain interface devices and to avoid any reactions to nonparticipating subassemblies which could occur otherwise on the bus line if module-specific or physical addresses are used.

The design of the on-board network according to the invention which initially serves only for the simplified transmission of switching information, can also be used to interlink certain switching states of the end devices logically with each other, optionally with consideration of time dependent conditions. Thereby, conventional relay circuits and simple electronic modules can be replaced. In a further embodiment of the invention, a bus interface also contains control and/or logic elements with which binary and/or digital data of any desired end devices can be linked logically with each other. The simple and systematic realization of the control and logic functions requires a uniform normalized signal representation within the on-board network, so that processing can be performed independently of the physical origin of the signals. By classifying the input element in the order of their most frequent occurrence in the motor vehicle, such as switches (on/off switches, double-throw switches, stepping switches, multiple switches) and analog transmitters, the number of different functions for processing the input signal can be limited substantially, so that systematic signal processing is possible. The transmission of the so-processed data via the bus line to another bus interface and the processing of the transmitted data in the receiving interface station by means of auxiliary functions which are directly correlated with the above mentioned input function serve for making ready that information of the end devices which ultimately can be processed further by a number of general basic operations. The linkages which can be carried out by means of the control and/or logic elements include logical operations on binary states, time, counting and memory functions as well as comparison operations of digital or digitalized analog values. By suitable combination and multiple application of these basic operations, the major part of the necessary linkages for switching and controlling or also for simple control operations can be realized. Signal linkages which cannot be realized in this manner can be covered by special software modules.

In conjunction with the logical interlinking of signals of the end devices, the individual control devices take over only the direct output of binary signals with or without monitoring the actual switching state and direct output of analog signal values via pulse-width-modulated outputs, by converting the internal signal representation (digital) by signal converters into the necessary physical form. However, the possibility also exists to construct local control loops in a control device by feeding back analog signals from the end devices.

The on-board network according to the invention is advantageously operated by using a time division multiplex method by means of asynchronous signal transmission and random access of the bus interface to the bus line. The data transmission from the bus interfaces to the control devices is done advantageously cyclically, whereby regular actualization of the signal values is ensured. Here, the respective interface operates as the so-called master which organizes the data designated for the control devices. However, so that it is possible to react rapidly within the on-board network to signal changes at the end devices or to detected defects, it is advisable to enable each control device, for transmitting time-critical data to the associated bus interface. Therefore it may deliver a signal at predetermined points of the transmission cycle, which leads to the interruption of the transmission cycle in order to transmit time-critical data.

In order to ensure in the on-board network designed in accordance with the invention, especially with respect to the logical interconnections taking place by means of the logic and control elements, a uniform data base in the bus interface, and also to detect defects in the bus interface in short order, it is furthermore advisable to transmit on the bus line cyclically the state of end devices stored in the individual interface. The regular transmission to other bus interfaces takes place if a change of the state occurs, which is composed of the actual signal value and fault information of an end device, as soon as the load on the bus line permits. It is ensured thereby that with the control and/or logical connection of signals in the different bus interfaces, always identical data are utilized and heretofore faults can be tracked.

For the complete operation of the on-board network according to the invention there are required besides the bus line and the signal line, also power lines via which the required power is supplied to the end devices. It is advisable to run these power lines parallel to the bus line and the signal lines (which may be electrical or optical lines) for reasons of simple installation in the motor vehicle, or to use a suitable multiconductor line. For instance, groups of end devices which are connected to a control device could then be protected electrically by conventional fuses.

BRIEF DESCRIPTION OF THE DRAWINGS

An embodiment of the on-board network constructed in accordance with the invention is shown in FIGS. 1 to 5, wherein:

FIG. 1 shows schematically the basic architecture of the new on-board network;

FIG. 2 shows a schematic view of an on-board network arranged in a passenger car without the end devices;

DETAILED DESCRIPTION OF THE PREFERRED EMBODIMENT

Figure 3:
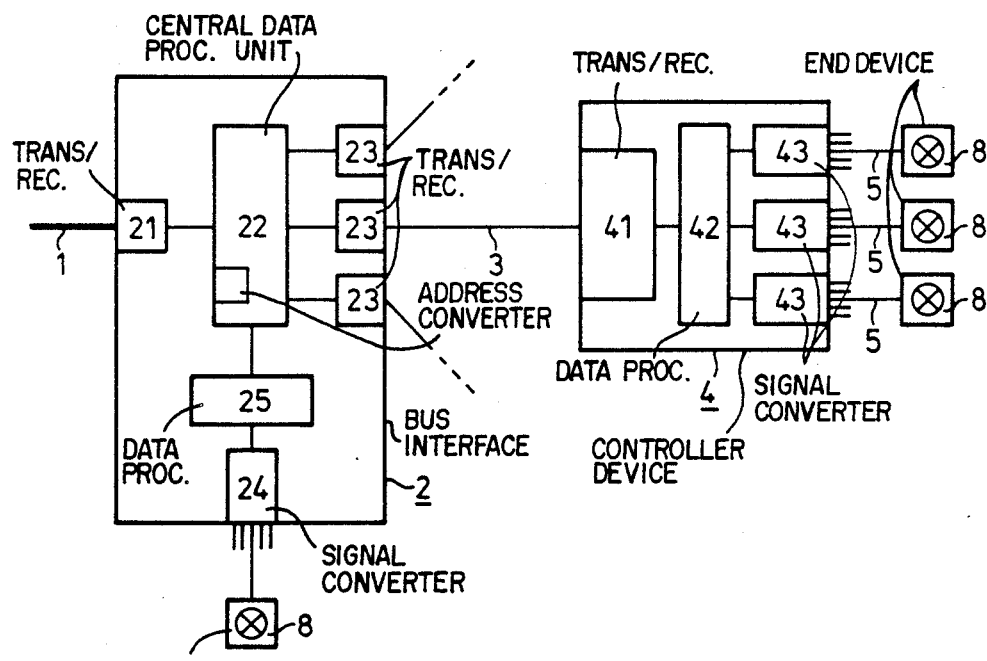
FIG. 3 shows a schematic view of a subsystem, consisting of a bus interface followed by a controller device.

As shown in FIG. 1, an on-board network in accordance with this invention consists of a bus line 1 with several bus interfaces 2 which are connected to this bus line to which one or more controller devices 4 are connected via signal lines 3 in a star configuration. End devices are assigned in star fashion, via respective connecting lines 5, to the controller devices 4. The end devices may consist of switches or other operating elements, as well as indicators, sensors 7 and actuators 8.

FIG. 2 shows the correlation of such on-board network with a passenger motor vehicle 10 which consists of several regions such as a front region 11 with the engine space, headlights and, for instance, windshield wipers, a dashboard 12, a central console 13, with the right doors 14 and 15, the left doors 16 and 17, and the stern region 18 with the trunk door, rear window and the back lights. The on-board network is arranged according to the invention in such a manner that the bus line 1 is substantially arranged along the longitudinal axis of the passenger car, with the bus interfaces 2 being arranged within the structurally stiff zone of the motor vehicle. More particularly, the assignment is made so that an interface 2 followed by two controller devices 4 is provided in the front area 11, a bus interface followed by three controller devices is assigned to the right area of the dashboard 12, including the right front door 14. A further bus interface followed by two interface devices, is provided for the left area of the dashboard 12 including the steering column, the left front door 16. A further bus interface 2 followed by three controller devices is provided for the central console of the passenger car for the two front seats as well as the rear right door 15 and rear left door 17. Finally, a last bus interface followed by two controller devices is provided for the rear area.

According to FIG. 3, each bus interface 2 contains a central data processing unit 22, connected to a transmitter/receiver 21 for exchanging data on the bus line 1. Three transmitter/receivers 23 are provided for communication between the bus interface 2 and corresponding controller devices 4, via signal lines 3 of which only one is shown in the figure. The controller device 4 contains a transmitter/receiver 41 for communication with the bus interface 2, a data processor 42, and three signal converters 43 following the data processor. These signal converters 43, are connected to the end devices 6, 7 and 8 via corresponding leads. The signal converters 43 convert the analog signals of the end devices such as voltage and current, into a suitable signals for processing and vice versa. This conversion of the signals and data is accomplished by means of electronic components such as transistors and integrated circuits. The data processor 42 shapes these signals and eliminates spurious signals produced for example by chattering. The processor 42 also collects signals coming from the end devices for coding and transmission by transmitter 41. The processor 42 also distributes and performs fault monitoring of the signal coming from the bus interface 2. The data processor 42 is a commercially available single-chip microcomputer which controls simultaneously the operation of the transmitter/receiver 41 and the signal converters 43.

Alternatively, end devices can be connected, if required, directly to the bus interface 2. For instance, a sensor 8 may be connected to a signal converter 24 and a data processor 25 provided within interface device 2 as shown in FIG. 3. Furthermore, an address converter is integrated into the central data processing unit 22 which performs the conversion of the local, subassembly-specific addresses into function-oriented addresses and vice versa.

Figure 4:
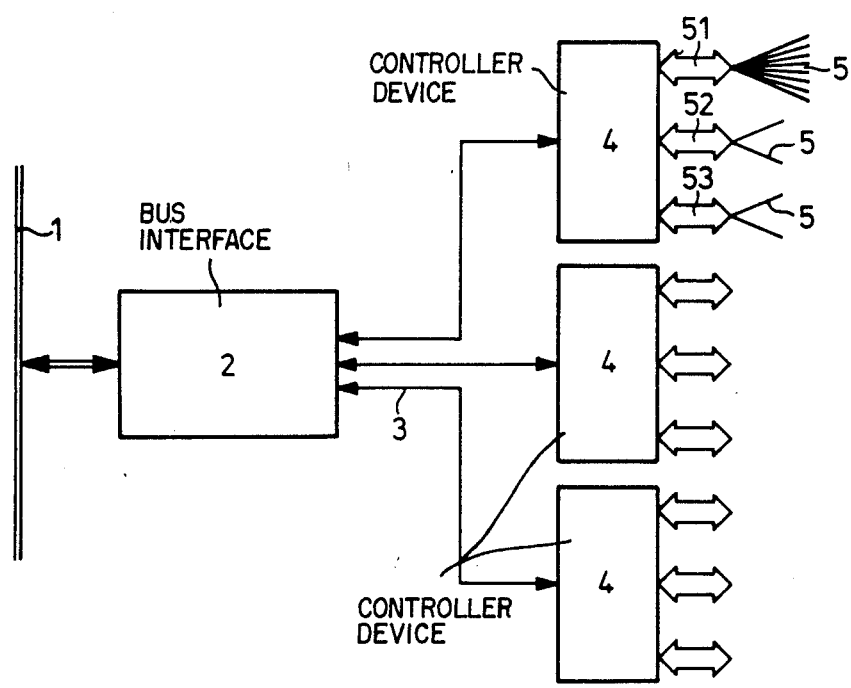
FIG. 4 shows a schematic view of a bus interface followed by three subservient control devices, the inputs and outputs of which are combined in groups.

According to the presentation of FIG. 4, the inputs and outputs associated with the end devices, of the controller devices 4 following a bus interface 2 are combined in groups in such a manner that always three groups of no more than eight inputs or outputs each are formed. Taking into consideration the various end devices, it is advisable to assign one of these groups to those end devices which receive or deliver analog signals and to assign two groups to those end devices which receive and/or deliver digital signals. Optionally, however, all three groups with eight digital inputs-/outputs each can be provided. In the drawing, the group outputs are shown by double arrows 51, 52, 53. The end devices, not shown in detail, are connected to the group output via the leads 5.

Figure 5:
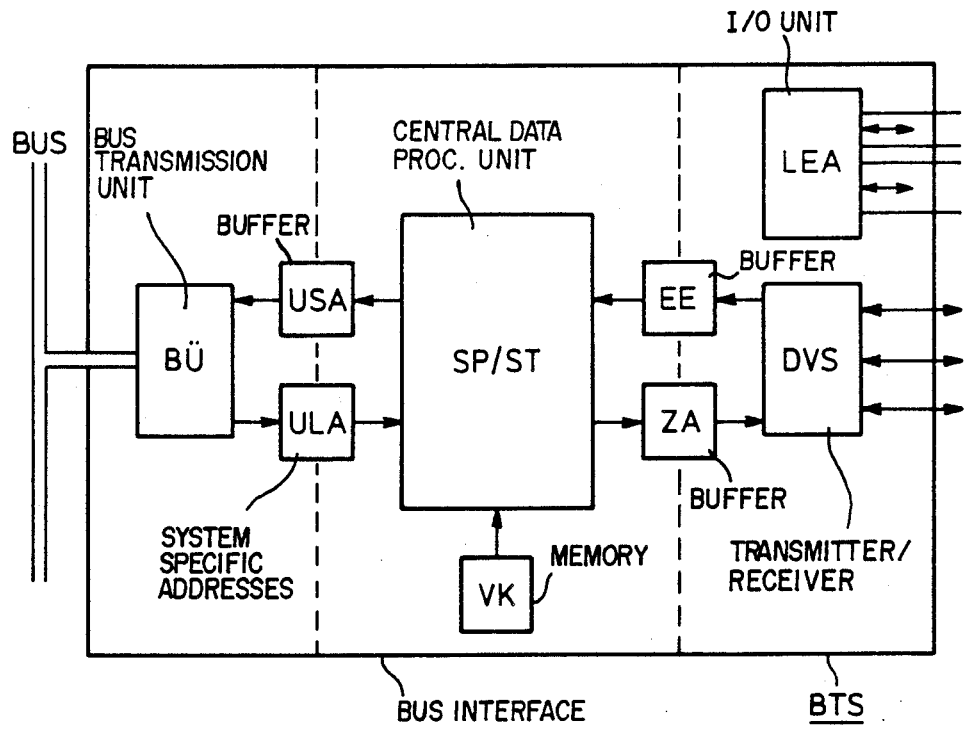
FIG. 5 shows the functional design of a bus interface device.

The functional design of a bus interface is shown in FIG. 5. The interface comprises substantially a central data processing unit which consists of a single-chip microcomputer SP/ST and a memory. In the memory of the single-chip microcomputer and/or an external memory, the system data, i.e., the information regarding the configuration of the on-board network, for instance, which addresses are of interest for the current bus interface and further the input and output states of the end devices associated with this bus interface, and further, the global states of the on-board network, i.e., the information relevant for the respective bus interface as opposed to other bus interfaces and the control variables for the processing and passing-on and optionally the interlinking of data are stored.

The connection of the bus interface BTS with the bus line BUS is a wired-or logic coupling with a transmission rate of about 10 kBd by means of the bus transmission unit BU. The bus transmission unit BU performs the reception and transmission of the data as well as collision detection. Received data are subjected to a conversion of the logic addresses into system-specific addresses (ULA) and are fed to the central memory and control SP/ST. As far as necessary, they are combined with already stored data (VK). The data are then collected for the control devices by buffer (ZA) and are processed for transmission to the control devices by transmitter (DVS). From there, the further transmission of the signal to the control devices takes place at a transmission rate of about 3 to 4 kBd which is reduced as compared with the bus line.

Signals transmitted from the control devices to the bus interface are received by receiver (DVS) and processed for transfer and incorporation by the central memory and control SP/ST by buffer (EE). After proper processing they are put together, after the message with the highest priority has been determined, for transmission to the bus line by a buffer (USA), where a conversion of the system-specific addresses into logical addresses takes place and are fed to the bus transmission unit BU.

Signals from end devices which are directly assigned to the interface, are integrated via a local input/output unit (LEA) directly into an internal bus of the interface.

In the described on-board network, the transmission on the bus line can be shut down completely by a short circuit. In order to prevent this, an alternate or backup bus line can be provided parallel to the bus line which makes possible limited operation in the individual bus interfaces together with transmitters/receivers assigned only to this alternate bus line. The feature insures that the motor vehicle is still operable, for instance, after a slight accident.

What is claimed is:

1. An on-board network for motor vehicles with multiplex control for switching, monitoring and controlling a plurality of end devices comprises:
   a plurality of control devices, each control device being connected to end devices in a star configuration, and having signal converters for exchanging end device signals with at least one end device;
   a plurality of bus interfaces, each bus interface being connected to said control devices in a star configuration, each bus interface having first transmitter/receiver means for exchanging control device signals with at least one of said control devices, second transmitter/receiver means and processor means, said first and second transmitter/receiver means being coupled to said processor means; and
   a common bus, said bus interfaces being connected to said common bus through said second transmitter/receiver means for exchanging data signals amongst said bus interfaces, said processor means in each of said bus interfaces controlling the end devices coupled to the respective bus interface via said control devices and each said bus interface operating substantially independently of said other bus interfaces.

2. The on-board network of claim 1 wherein said end device signals comprise at least one of analog and digital signals.

3. The on-board network according to claim 1, wherein each control device comprises a data processor for pre- and post-processing said control device signals received from a corresponding bus interface and to be transmitted to said corresponding bus interface.

4. The on-board network according to claim 1, wherein input and output lines of each control device are combined into one or several input and output groups of the same type;
   and wherein the processor means of each bus interface executes a cyclical transfer of data from and to a corresponding control device in sequence matching inputs and outputs of the respective control device.

5. The on-board network according to claim 1, wherein at least one bus interface comprises additionally a further signal converter for direct exchange of end drive signals with end devices; and a data processor coupling said further signal converter with said processor means.

6. The on-board network according to claim 1, wherein each end device is assigned a local address and wherein each bus interface contains an address converter for logical conversion of the local address of the end device into a global function-oriented address and vice versa.

7. The on-board network according to claim 1, wherein said bus interfaces contain logic elements, for linking binary and/or digital data which correspond to signal values of the end devices.

8. The on-board network according to claim 1, wherein no more than three control devices are associated with one bus interface and wherein one control device has no more than 24 inputs/output connections to said end devices.

9. The on-board network according to claim 1 wherein each of said motor vehicles has at least one dimensionally stiff zone with a longitudinal axis and a plurality of deformable zones and wherein said end and control devices are arranged in said deformable zones and said common bus and said bus interfaces are arranged adjacent to said longitudinal axis substantially in said dimensionally stiff zone.

10. The on-board network according to claim 1, wherein said control devices are associated with certain body areas of said motor vehicles such as doors, front area, rear lights, dashboard or central console with operating elements, vehicle seat, air conditioning system, respectively.

11. A method for operating an on-board network for motor vehicles with multiplex control for switching, monitoring and controlling a plurality of end devices, wherein the network comprises a plurality of control devices, each control device being connected to end devices in a star configuration, and having signal converters for exchanging end device signals with at least one end device; a plurality of bus interfaces, each bus interface being connected to said control devices in a star configuration, each bus interface having first transmitter/receiver means for exchanging control device signals with at least one of said control devices, second transmitter/receiver means and processor means connecting said first and second transmitter/receiver means; and a common bus, said bus interfaces being connected to said common bus through said second transmitter/receiver means for exchanging data signals amongst said bus interfaces, said bus interfaces operating substantially independently of one another; the method comprising exchanging data cyclically in a transmission cycle from a bus interface with corresponding control devices, and delivering a signal from the control devices for the interruption of the transmission cycle for the transmission of time critical information to the corresponding bus interface at predetermined points of the transmission cycle.

12. A method for operating an on-board network for motor vehicles with multiplex control for switching, monitoring and controlling a plurality of end devices, wherein the network comprises a plurality of control devices, each control device being connected to end devices in a star configuration, and having signal converters for exchanging end device signals with at least one end device; a plurality of bus interfaces, each bus interface being connected to said control devices in a star configuration, each bus interface having first transmitter/receiver means for exchanging control device signals with at least one of said control devices, second transmitter/receiver means and processor means connecting said first and second transmitter/receiver means; and a common bus, said bus interfaces being connected to said common bus through said second transmitter/receiver means for exchanging data signals amongst said bus interfaces, said bus interfaces operating substantially independently of one another; the method comprising transmitting from each bus interface signals on the common bus in response to control signals from the signal converters of the associated control devices and internal system states of the bus interface and of the control devices in a cycle, and interrupting the cycle each time a state to be transmitted changes, and transmitting the changed state.

13. The method according to claim 11, further comprising transmitting signals from each bus interface on the bus in response to control signals from the signal converters of the associated control devices and internal system states of the bus interface and of the control devices in a cycle, and interrupting the cycle each time a state to be transmitted changes, and transmitting the changed state.

14. The method according to claim 12, wherein said step of transmitting from each bus interface on the common bus comprises the step of transmitting signals from the signal converters of the associated control devices and linking the signals with each other by control and logic elements.

15. The method recited in claim 13, wherein the step of transmitting from each bus interface on the common bus comprises the step of transmitting signals from the signal converters of the associated control devices and linking the signals with each other by control and logic elements.

* * * * *